Patented June 10, 1952

2,599,631

UNITED STATES PATENT OFFICE 2,599,631

PREPARATION OF VINYL FLUORIDE

Jesse Harmon, Wilmington, Del., assignor to E. I. du Pont de Nemours & Company, Wilmington, Del., a corporation of Delaware No Drawing. Application December 6, 1945, Serial No. 633,265

6 Claims. (Cl. 260—653)

This invention relates to the preparation of vinyl fluoride and, more particularly, to a process of preparing vinyl fluoride by pyrolysis.

Heretofore, vinyl fluoride has been synthesized directly from acetylene and hydrogen fluoride under pressure in the absence of catalyst and at ordinary pressures in the vapor phase employing mercuric oxide or mercuric halide catalysts, preferably supported on charcoal. This compound has also been synthesized by the action of hydrogen fluoride on ethylidene chloride at elevated temperatures. The direct synthesis of the vinyl fluoride is characterized by low space-time yields and the catalytic method by short active life of the catalyst which render these methods unsatisfactory for commercial operation. The synthesis involving ethylidene chloride and hydrogen fluoride is unsatisfactory for commercial operation because vinyl fluoride is actually a minor constituent of the product from this reaction. No other methods of preparing vinyl fluoride any better adapted for economical and practical large scale operation have been known in the art.

An object of the present invention is to provide a new and improved process of preparing vinyl fluoride. A further object is to provide such a process which may be readily and economically carried out in a large scale operation. A particular object is to provide such a process employing readily procurable starting materials and capable of giving high yields and conversions in relatively simple and economical apparatus. Other objects will be apparent from the description of the invention given hereinafter.

The above objects are accomplished according to the present invention by heating 1,1-difluoroethane at a temperature of 100° C. to 1000° C. to effect dehydrofluorination thereof and recovering vinyl fluoride from the products so obtained. The process is preferably carried out in the presence of a dehydrofluorination catalyst and at a temperature of 300° C. to 600° C.

1,1-difluoroethane may be readily obtained by reacting acetylene and hydrogen fluoride in the presence of boron trifluoride as disclosed in detail in application Serial No. 633,556, filed December 7, 1945, now U. S. Patent 2,425,991, in the names of Burk, Coffman and Kalb. It has now been discovered that by heating 1,1-difluoroethane a dehydrofluorination reaction readily takes place whereby good conversions and high yields of vinyl fluoride are obtained. The conversions and yields may be improved by conducting the reaction in the presence of a dehydrofluorination catalyst, preferably charcoal or free metals, oxides, or salts of the elements of groups IA, IB, IIA, IIB, VB and VIII of the periodic table or oxygen.

The process may be conveniently carried out by leading the 1,1-difluoroethane through a pipe heated to the desired temperature by means of an electric furnace or other heating device, the pipe containing the catalyst if one is to be used. The exhaust gases from the converter are freed of hydrogen fluoride by condensation, reaction with soda and lime, reaction with sodium fluoride, or by other suitable means and the organic vapors are liquefied by cooling and compression or are condensed in a solid carbon dioxide-acetone cooled trap. The vinyl fluoride may then be obtained by fractionation from the unreacted 1,1-difluoroethane.

The following examples illustrate specific embodiments of the invention, all parts being given by weight unless otherwise specified:

Example I

Over a period of twenty minutes a total of 217 parts of 1,1-difluoroethane was bled through a one inch diameter Inconel pipe heated to 562° C.–797° C. over a ten inch length by means of an electric furnace. After removal of the hydrogen fluoride by condensation in an ice trap followed by scrubbing of the effluent gases with soda and lime, and after removal of acetylene with aqueous silver nitrate solution, the gaseous product was condensed and cooled in a solid carbon dioxide-acetone cooled trap. Distillation of the trap material gave 48.6 parts of vinyl fluoride (boiling point −70° C. to −62° C.), 24.4 parts of intermediate material (boiling point −62° C. to −30° C., a mixture of vinyl fluoride and unreacted 1,1-difluoroethane), and 82 parts of unchanged 1,1-difluoroethane. This represents a yield of 71% and a conversion of 40% based on the 1,1-difluoroethane charge.

Example II

Over a period of two hours and forty-five minutes a total of 60 parts of 1,1-difluoroethane was led over a steel wool surface contained in an iron pipe one inch in diameter and heated to 330° C.–334° C. The gases from this converter were freed of hydrogen fluoride with sodium fluoride and the product was condensed in a solid carbon dioxide-acetone cooled trap. Distillation of the product gave 2.4 parts of vinyl fluoride which boils at −72° C. when rigorously purified.

Again carrying out the operation as described above a total of 70 parts of moisture- and acetylene-free 1,1-difluoroethane was passed over steel wool at 600°±25° C. The hydrogen fluoride was separated from the exit gases which were then condensed. On distillation there was obtained 31.5 parts of vinyl fluoride representing a 64% conversion and 88% yield based on the 1,1-difluoroethane employed. This illustrates the effect of raising the reaction temperature on the conversion and yield obtained.

*Example III*

Employing the apparatus described in Example II, iron chromite was substituted for steel wool as the catalyst. A total of 61 parts of 1,1-difluoroethane was passed over this catalyst maintained at 350° C. during the period of one hour and forty-five minutes. After separation of the hydrogen fluoride and liquefaction of the gases, there was obtained on distillation 4 parts of vinyl fluoride. At higher temperatures, higher conversions to vinyl fluoride were observed.

*Example IV*

Employing the apparatus described in Example II, a total of 23 parts of 1,1-difluoroethane was passed over calcium fluoride maintained at about 500° C. On the basis of the molecular weight of the off-gases after removal of the hydrogen fluoride, the conversion to vinyl fluoride was 66% and the yield was 75%.

*Example V*

Into the apparatus described in Example II, a total of 70 parts of 8 to 14 mesh activated charcoal was charged. During a period of forty-five minutes a total of 15 parts of 1,1-difluoroethane was led over the charcoal at about 600° C. According to the molecular weight of the hydrogen fluoride-free off gases, 78% of the difluoroethane was converted to vinyl fluoride and the yield of product was 84%.

It will be apparent that the above examples are merely illustrative and the present invention broadly comprises heating 1,1-difluoroethane at an elevated temperature to effect dehydrofluorination thereof and recovering vinyl fluoride from the products so obtained.

The reaction is preferably carried out in the presence of dehydrofluorination catalysts which, in general, allow the use of appreciably lower temperatures while at the same time giving good conversions and yields. These dehydrofluorination catalysts comprise oxygen, charcoal, and the free metals, salts and oxides of the elements of the groups of IA, IB, IIA, IIB, VB, and VIII of the periodic table. Suitable salts include bromides, borates, chlorides, chromates, chromites, dichromates, iodides, manganates, molybdates, nitrates, selenates, sulfates, vanadates, tungstates, uranates, halogenates and particularly the fluorides. Salts of organic acids which do not decompose at the temperature of dehydrofluorination may also be used such as the formates, acetates, propionates, oxalates and benzoates.

The above mentioned catalysts may be employed in bulk form or supported on or dispersed in carriers, especially those inert to the action of hydrogen fluoride at the temperatures employed. In the case of nonporous carriers, binders may be necessary to cause the active catalysts to adhere to the supporting surface. Suitable classes of supports include charcoal, steel wool, copper wool, carborundum and fibers of plastic materials and synthetic polymers which are inert to hydrogen fluoride. Oxygen, when used as a catalyst, may be introduced along with the 1,1-difluoroethane into the reactor.

The reaction of the present invention may be carried out over a wide temperature range from 100° C. to 1000° C. depending upon the prevailing conditions. A temperature of at least 600° C. should normally be employed in the absence of a catalyst and, preferably, the temperature in such cases should be from 600° C. to 800° C. While the optimum temperature varies somewhat from catalyst to catalyst, the presence of catalyst does permit, in general, the effective use of lower temperatures, the preferred range being from 300° C. to 600° C. where maximum activity without appreciable degradation of the vinyl fluoride being formed is ordinarily observed. At lower temperatures the dehydrofluorination of vinyl fluoride to acetylene, which occurs to a slight extent concurrently with the dehydrofluorination of 1,1-difluoroethane, is considerably less than at higher temperatures. Employing preferred catalysts such as charcoal at 600° C. and steel wool at 400° C. to 500° C., the amount of acetylene formed is less than 0.1%.

The time of contact will depend to a considerable extent upon the particular catalyst employed, if any, and the temperature employed but will usually be within the range of 0.01 seconds to three minutes. At the higher temperatures lower contact times are advisable to prevent dehydrofluorination of the vinyl fluoride to acetylene; also, the contact time does not have to be so long at higher temperatures to get good conversions. In the temperature range of 300° C. to 400° C. contact times of 0.5 seconds to two minutes will give high conversions of 1,1-difluoroethane to vinyl fluoride in the presence of a good dehydrofluorination catalyst. On the other hand, using a temperature of 600° C. to 800° C. such as would be employed in the absence of a catalyst, a contact time of not over 0.5 seconds should be employed in order to prevent excessive degradation of the vinyl fluoride. The addition of inert diluent gases such as nitrogen is often beneficial in order to minimize localized heating.

Because of simplicity of operation, it is usually preferable to carry out the dehydrofluorination of 1,1-difluoroethane continuously at ordinary pressures. Higher pressures may, however, be used in the continuous system and the use thereof has a certain advantage in that it facilitates condensation of the vinyl fluoride and other off-gases. The reaction can also be carried out in a batchwise method, particularly under pressure in a pressure vessel.

The type of metal employed for the reactor is a considerable factor in practicing the invention. For example, if an iron tube is used, the reactor itself exhibits some catalytic activity for the dehydrofluorination of 1,1-difluoroethane to vinyl fluoride. However, this advantage is generally more than offset by the high corrosion rate of the iron which necessitates frequent replacement of the reactor and it is more practical to use a reactor made of a metal not subject to appreciable corrosion under the prevailing conditions, such metals including Inconel, platinum, Hasteloy B, Hasteloy D, and Monel.

The degree of purity of the 1,1-difluoroethane used is not a critical factor in this invention but it is expedient to employ 1,1-difluoroethane of high purity in order to simplify the refining of the vinyl fluoride produced. As those skilled in the art will appreciate, a considerable proportion of some contaminant reactive under the conditions in the reactor could greatly reduce the effectiveness of the process and naturally such contaminant should be avoided. It is also desirable to employ 1,1-difluoroethane substantially free of water vapor since the presence of water tends to decrease the conversion to vinyl fluoride.

An advantage of the present invention is that it provides a simple and practical method of converting 1,1-difluoroethane to vinyl fluoride which latter product is useful for the preparation of polymers possessing an outstanding combination of physical properties desirable for many plastic applications. Vinyl fluoride is also useful as an intermediate in the manufacture of organic fluorine-containing derivatives and providing a process of preparing this compound in substantial quantity is a matter of importance to the art.

As many apparently widely different embodiments of this invention may be made without departing from the spirit and scope thereof, it is to be understood that the invention is not limited to the specific embodiments thereof except as defined in the appended claims.

I claim:

1. Process of preparing vinyl fluoride which comprises heating 1,1-difluoroethane at a temperature of 100° C. to 1000° C. for a period not in excess of three minutes.

2. Process of preparing vinyl fluoride which comprises heating 1,1-difluoroethane at a temperature of 600° C. to 800° C. for a period not in excess of three minutes.

3. Process of preparing vinyl fluoride which comprises passing 1,1-difluoroethane gas at substantially atmospheric pressure through a reactor maintained at a temperature of 600° C. to 800° C. said gas being heated to said temperature for a period not in excess of three minutes, condensing the off-gases from said reactor and separating vinyl fluoride therefrom.

4. Process for preparing vinyl fluoride which comprises heating 1,1-difluoroethane at a temperature of 300° C. to 600° C. for a period not in excess of three minutes in the presence of a catalyst.

5. A process of preparing vinyl fluoride which comprises passing 1,1-difluoroethane gas at substantially atmospheric pressure through a reactor maintained at a temperature of 300° C. to 600° C. and containing therein a catalyst, the said gas being heated to the said temperature for a period not in excess of three minutes; condensing the off-gas from the said reactor and separating vinyl fluoride therefrom.

6. Process of preparing vinyl fluoride which comprises heating 1,1-difluoroethane at a temperature of 350° C. to 1000° C. for a period not in excess of three minutes.

JESSE HARMON.

REFERENCES CITED

The following references are of record in the file of this patent:

UNITED STATES PATENTS

| Number | Name | Date |
|---|---|---|
| 1,986,876 | Baxter | Jan. 8, 1935 |
| 2,118,901 | Soll | May 31, 1938 |
| 2,387,247 | Downing et al. | Oct. 23, 1945 |

OTHER REFERENCES

Biltz, Berichte Deutsch. Chem. Ges., vol. 35, pp. 3524–28 (1902), also vol. 37, p. 2398 (1904).

Senderens, Bull. Soc. Chem. de France, 4th series, vol. 3, pp. 823–829 (1908).

Henne et al., J. Am. Chem. Soc., vol. 61, pp. 938–940 (1939).